(12) United States Patent
Steiner (10) Patent No.: US 12,415,559 B2
(45) Date of Patent: Sep. 16, 2025

(54) TRANSPORT DEVICE HAVING A ROLLING BODY

(71) Applicant: Thomas Steiner, Kloten (CH)

(72) Inventor: Thomas Steiner, Kloten (CH)

(73) Assignee: Swiss Full Panorama GmbH, Herrliberg (CH)

( * ) Notice: Subject to any disclaimer, the term of this patent is extended or adjusted under 35 U.S.C. 154(b) by 803 days.

(21) Appl. No.: 17/633,838

(22) PCT Filed: Jul. 13, 2020

(86) PCT No.: PCT/EP2020/069758
§ 371 (c)(1),
(2) Date: Feb. 8, 2022

(87) PCT Pub. No.: WO2021/028137
PCT Pub. Date: Feb. 18, 2021

(65) Prior Publication Data
US 2022/0295956 A1    Sep. 22, 2022

(30) Foreign Application Priority Data
Aug. 15, 2019   (CH) .................................. 01027/19

(51) Int. Cl.
*B62B 5/06* (2006.01)
*B62B 1/18* (2006.01)
(Continued)

(52) U.S. Cl.
CPC ................ *B62B 5/068* (2013.01); *B62B 1/18* (2013.01); *A45C 5/146* (2013.01); *A45C 13/30* (2013.01); *B62B 7/02* (2013.01); *B62B 2301/254* (2013.01)

(58) Field of Classification Search
CPC .......................... B62B 5/068; B62B 2301/254
See application file for complete search history.

(56) References Cited

U.S. PATENT DOCUMENTS

| | | | | |
|---|---|---|---|---|
| 2,967,058 A * | 1/1961 | Hoffmann, Jr. | .......... | A47C 1/14 280/30 |
| 3,054,622 A * | 9/1962 | Davis | .................. | A45C 13/385 280/47.3 |

(Continued)

FOREIGN PATENT DOCUMENTS

| CN | 102837720 A | 12/2012 |
|---|---|---|
| DE | 102014001837 B3 | 3/2015 |

(Continued)

OTHER PUBLICATIONS

EPO, Munich, DE, EPO Form 1507N 06.12, Communication with Form 1503 03.82, Ext. EP Search Report for European Patent Application No. EP 23 20 3692, Feb. 19, 2024 (9 pp).

(Continued)

*Primary Examiner* — Kevin Hurley
(74) *Attorney, Agent, or Firm* — Pauley Erickson & Swanson (57) ABSTRACT

A transport device, in particular for transporting luggage, includes a support structure, a coupling element or a handle and a rolling body in addition to a transport container for receiving objects, in particular luggage. The rolling body has a rotational symmetry and is configured such that it tapers in diameter towards the ends along the axis of symmetry. Because of the arrangement and design of the transport container, the transport device is self-stabilizing in operative use.

19 Claims, 10 Drawing Sheets

(51) Int. Cl.
*A45C 5/14* (2006.01)
*A45C 13/30* (2006.01)
*B62B 7/02* (2006.01)

(56) References Cited

U.S. PATENT DOCUMENTS

| | | | | |
|---|---|---|---|---|
| 4,659,142 | A * | 4/1987 | Kuchinsky, Jr. | B62B 1/12 |
| | | | | 297/118 |
| 4,815,761 | A * | 3/1989 | Henderson | B62B 1/22 |
| | | | | 280/47.3 |
| 5,005,844 | A * | 4/1991 | Douglas | B62B 5/068 |
| | | | | 172/353 |
| 5,385,355 | A * | 1/1995 | Hoffman | B62D 51/04 |
| | | | | 280/47.32 |
| 5,820,141 | A * | 10/1998 | Wilkerson | B62B 5/0023 |
| | | | | 280/30 |
| 6,139,033 | A * | 10/2000 | Western | B62B 1/02 |
| | | | | 280/47.23 |
| 6,935,643 | B1 * | 8/2005 | Purpuro | B62B 5/068 |
| | | | | 280/47.32 |
| D530,054 | S * | 10/2006 | Laiche | D34/24 |
| 7,322,905 | B2 * | 1/2008 | Morris | A63B 69/34 |
| | | | | 73/379.06 |
| 7,484,737 | B2 * | 2/2009 | Satorius | A45F 3/14 |
| | | | | 280/47.32 |
| 7,549,648 | B2 * | 6/2009 | Girard | B62B 5/0438 |
| | | | | 280/47.32 |
| 7,998,030 | B2 * | 8/2011 | Wroclawsky | A63B 23/047 |
| | | | | 482/111 |
| 8,056,781 | B1 * | 11/2011 | Rowe | B62B 5/068 |
| | | | | 224/575 |
| 9,216,796 | B2 * | 12/2015 | Kartalopoulos | B62B 1/18 |
| 9,227,644 | B1 * | 1/2016 | Piscitello | B62B 1/20 |
| 10,336,355 | B1 | 7/2019 | Dubose | |
| 12,103,574 | B1 * | 10/2024 | Lindsey | B62B 1/12 |
| 2004/0130112 | A1 | 7/2004 | Doyle | |
| 2006/0055128 | A1 * | 3/2006 | Scott | B62B 5/068 |
| | | | | 280/1.5 |
| 2007/0290460 | A1 | 12/2007 | Girard et al. | |
| 2011/0272924 | A1 | 11/2011 | Kilen | |
| 2012/0091674 | A1 | 4/2012 | Kartalopoulos | |
| 2016/0200335 | A1 * | 7/2016 | Piscitello | A61G 1/0225 |
| | | | | 440/12.55 |
| 2017/0144683 | A1 | 5/2017 | Moskovsky | |
| 2024/0326606 | A1 * | 10/2024 | Iimura | B62B 5/0069 |

FOREIGN PATENT DOCUMENTS

| | | |
|---|---|---|
| EP | 2679467 A2 * | 1/2014 |
| FR | 2941667 A1 | 8/2010 |
| GB | 2322601 A | 9/1998 |
| GB | 2523995 A | 9/2015 |
| JP | 2016185802 A | 10/2016 |
| WO | WO 2010/147630 A1 | 12/2010 |

OTHER PUBLICATIONS

Chinese Patent Office (CNIPO), Bejing, P.R. China, Office Action for Chinese Application No. 202080056944.4, issued Oct. 26, 2023 (11 pages).

EPO (Riswijk, NL), English language version of the International Search Report, Form PCT/ISA/210, for International Application PCT/EP2020/069758, Oct. 1, 2020 (3 pages).

* cited by examiner

Stand der Technik

TRANSPORT DEVICE HAVING A ROLLING BODY

CROSS REFERENCE TO RELATED APPLICATION

This application is a National Phase filing in the United States, under 35 USC § 371, of PCT International Patent Application PCT/EP2020/069758, filed on 13 Jul. 2020 which claims the priority of Swiss Patent Application CH 01027/19, filed 15 Aug. 2019.

These applications are hereby incorporated by reference herein in their entirety and is made a part hereof, including but not limited to those portions which specifically appear hereinafter.

BACKGROUND OF THE INVENTION

Field of the Invention

The present invention concerns the field of transport devices, in particular for transport of luggage.

Discussion of Related Art

Transport devices are known from the prior art, in particular rolling suitcases and rucksacks with rollers or trolleys, which consist of a suitcase or luggage area for receiving and transporting objects, transport means arranged in the region of an underside and/or back side of the suitcase area, and a handle arrangement. These transport devices allow sliding or rolling maneuvering only along a substantially flat surface, or have relatively large, cumbersome and heavy wheels.

SUMMARY OF THE INVENTION

The disadvantage of the transport devices known from the prior art with comparatively small wheels or rollers is the restricted suitability for use on rough ground, in particular the compatibility with respect to obstacles situated on the ground.

The disadvantage of the transport devices known from the prior art with relatively large wheels or rollers is their weight and unwieldiness, and often also their width, in particular if the wheels are mounted at the side of the transport device or protrude beyond this.

Furthermore, transport devices with wheels easily sink into soft ground (gravel, sand, wet soil etc.), because of the relatively small contact area.

The general object of the invention is to refine the prior art in the field of transport devices, in particular a transport device which is self-stabilizing in operative use and suitable for use on rough ground, which may comprise several rolling bodies but also functions with only one rolling body. In some embodiments, the rolling body tapers in diameter towards the ends along the axis of symmetry, in particular is configured so as to be ellipsoid.

This object is achieved by the transport device defined in the independent claim.

Further advantageous embodiments arise from the dependent claims, the description and the drawings.

A first aspect of the disclosure concerns a transport device, in particular for transporting luggage, which comprises a support structure, a coupling element, a rolling body and a transport container for receiving objects, in particular luggage. The transport container may be releasably or fixedly connected to the support structure. The rolling body has an axis of symmetry and a rotational symmetry, and a diameter of the rolling body may be less than or equal to its extent along the axis of symmetry or rotational axis. The support structure interconnects the coupling element and the rolling body, and more than half the volume of the transport container (and hence, in particular with typical or even loading, also the center of gravity of the transport device) is arranged on a first side of a plane which faces the ground surface in operative use. The plane is defined by two points on the axis of symmetry of the rolling body and the center point of the coupling element. The transport container is arranged between the coupling element and the rolling body. In operative use, the rolling body rolls over the ground surface. The coupling element serves for transmission of an external force to the transport device for its movement. For example, to pull the transport device, the user would do this via the coupling element.

In some embodiments, more than 70%, in particular more than 90% of the volume of the transport container is arranged on the first side of the described plane facing the ground surface or ground. In variations of the transport device, the entire volume of the transport container is arranged on the first side of the described plane facing the ground surface or ground.

The positioning and arrangement of the transport container described herein have the advantage that, in operative use, the center of gravity of the transport container is arranged below the described plane; thus, similarly to a pendulum, a return force or torque is exerted on the device, as soon as the device is rotated about its longitudinal axis out of its equilibrium position, so that it moves back into its equilibrium position. This stabilizes the position of the transport device and minimizes the probability of tipping over, even if the transport device is fitted with only one rolling body. Fitting only one rolling body allows a lighter and more slender construction of the transport device than, for example, one with two relatively large wheels arranged on the sides according to the prior art.

In some embodiments, the diameter of the rolling body, at each position perpendicular to an axis of symmetry, may be less than or equal to the length or width of the rolling body. The diameter of the rolling body may be 90% of the width of the rolling body, in particular 60% or for example also 40%.

In some embodiments, the rolling body may be configured such that it tapers in diameter towards the ends along the axis of symmetry, in particular the rolling body may substantially be configured in the form of a rotational ellipsoid or a double cone. An advantage of use of such a rolling body lies in the general compatibility towards unevenness in the ground surface. The rolling body also rolls over obstacles which could stop a transport device known from the prior art with two wheels on its axle, even if the wheels have a diameter which is the same size as that of the rolling body of the disclosure. On soft ground (gravel, sand, wet soil etc.), in contrast to relatively narrow wheels, the contact area of the relatively wide rolling body increases automatically on the slight sinking. Further sinking is thereby prevented. The rolling body in a form similar to a rotational ellipsoid is furthermore advantageous since, on rotation of the transport device about its longitudinal axis, only a slight additional torque is applied to the center of gravity of the transport container. This is the case since the rolling body, the center point of which may contain the longitudinal axis, can co-rotate to the same extent and there is still a contact point on the rolling body. This means a smaller additional torque than if the rolling body were formed as a cylinder or replaced by two wheels; namely, the full height of an obstacle lying in the outer region of the cylinder or under one wheel would cause a correspondingly higher torque. The torque would moreover also be higher in an embodiment of the rolling body as a sphere or ball, since in such cases, the radius of the sphere or ball by definition offers the same diameter both in the longitudinal and also the transverse axis, whereas the ellipsoid may have a substantially greater diameter in the transverse axis of the transport device, which thus has a stabilizing effect in comparison with the sphere or ball.

The ellipsoid thereby contributes to the stability of the transport device since it supports the return swing of the transport device into its starting position.

In some embodiments, the rolling body may be divided into two pieces, with two symmetrical halves, wherein a plane of symmetry may stand perpendicularly to the rotational axis of the rolling body and run through the volume center point of the rolling body.

In further embodiments, the rolling body may be segmented into two or more segments. This has the advantage that the axis of the rolling body may be arranged so that it does not run through the air chambers of the inflatable variant of the rolling body, which reduces the probability of an air leakage or pressure fall. A further advantage lies in an increased redundancy for the case that one of the segments loses the increased pressure in the interior, whereby the functionality of the rolling body could be maintained by the remaining segments.

In some embodiments, the support structure, on the side opposite the coupling element, may be configured for receiving the rolling body such that the rolling body can be connected to the support structure so as to be rotatable about its rotational axis. Thus, in the same way as wheel suspensions, wheel end pieces may be inserted in the rolling body in order to create the connection.

In further embodiments, the support structure comprises receiving points for a releasably arranged axle running through the rolling body for the rotatable mounting of the rolling body.

In further embodiments, the support structure comprises receiving points for a fixedly arranged axle running through the rolling body for the rotatable mounting of the rolling body.

In all variants, in principle the torque exerted by the transport device on the user is lower, (i) the shorter the distance between the center of gravity of the transport device and the axle of the rolling body, relative to the distance between the center of gravity of the transport device and the user, and (ii) the greater the tilt angle of the transport device to the ground surface during pulling, i.e., the more upright the transport device is pulled.

In some embodiments, the support structure of the transport device may comprise connected webs and be configured as a frame, chassis or skeleton structure.

In some embodiments, the support structure of the transport device may be configured as one piece or integrally with the transport container, or be connected thereto. Thus, it is possible that the transport container performs structural or supporting functions for the transport device.

In some embodiments, the support structure comprises an arrangement of rods and/or adjoins the transport container, in particular stiffened portions of the transport container. The arrangement of rods may comprise various materials, wherein metals, plastic and composite materials etc. are possible. Advantageously, the support structure is configured such that no or only little deformation occurs, in particular sagging in the direction of the ground surface, in various load states, in particular in the fully loaded and empty states.

In some embodiments, in particular in the case that the transport container is configured so as to be integral with the support structure, the support structure may be configured so as to be flexible in at least a part region, so that the transport device deforms to a greater or lesser extent depending on the load of the transport container. In addition, or alternatively, the support structure may be configured to be suspended at least in part regions. In some embodiments, the support structure may be configured to be arch-shaped at least in part regions, wherein the arc is oriented in the direction of the center of gravity or against the direction of center of gravity. In the same way as a leaf spring, an arch-shaped support structure allows a suspended transport of objects. This potentially allows sagging or deformation in the direction of the ground surface, and a reduced ground clearance depending on the concrete arrangement of the rolling body, but this does not alter the principle or function of the transport device. The support structure as such and/or the transport container is here configured so as to be flexible in at least one part region.

In some embodiments, the transport container may be connected to the support structure by straps, a net, a tarpaulin, a bag or similar. The support structure as such may be designed so as to be flexible in at least one part region, and/or the net, tarpaulin, bag or similar may be configured so as to be integral with the support structure, so that the transport device deforms according to the loading of the transport container. This potentially allows sagging or deformation in the direction of the ground surface, and a reduced ground clearance depending on the concrete arrangement of the rolling body, but this does not alter the principle or function of the transport device. The support structure may be configured to be foldable or collapsible.

In some embodiments, the support structure may in particular be angled between the coupling element and transport container, and/or between the rolling body and transport container, wherein in this embodiment again, more than half the volume of the transport container (and hence, in particular with typical or even loading, also the center of gravity of the transport device) is arranged on a first side of a plane which faces the ground surface in operative use.

In some embodiments, the rolling body is fixedly or releasably connected to the support structure. This allows the advantageous attachment and removal of the releasably connected rolling body, depending on the desired use of the transport device. Furthermore, in the case of a permanent and fixed connection to the support structure, the strength of the connection to the support structure is increased.

In some embodiments, the rolling body comprises at least one inflatable segment and at least one valve. This allows various advantageous states of the rolling body, in particular a filled/inflated and an evacuated state, depending on use of the rolling body. If the rolling body is releasably arranged on the support structure, it may be removed therefrom and evacuated after use of the transport device, which allows a space-saving storage of the rolling body. Furthermore, an inflatable rolling body is advantageous since, by deformation of the rolling body, this can compensate for any unevenness of the ground surface over which it rolls; this promotes smoother rolling of the rolling body and hence of the transport device.

Inflatable variants of the rolling body also allow a substantially lighter construction than wheels. Admittedly, wheels from the prior art may also be provided with an inflatable profile, but the rims necessary for this are typically relatively heavy.

In some embodiments, the rolling body comprises at least one flexible and tear-resistant material, in particular plastic, such as for example nylon, nylon ripstop, polyester, polyester ripstop, polyurethane, EVA, rubber, leather etc. The material may be used for the rolling body envelope so that this can be made stable for rolling and also flexible for adaptation to unevenness on the ground surface.

In some embodiments, the coupling element may be configured as a handle for comfortable pulling of the transport device by the user.

In some embodiments, the support structure is configured so as to be foldable between the transport container and the rolling body, so that the rolling body can be folded up in a direction towards the underside or top side of the transport container. The underside of the transport container is that facing the ground surface in operative use. Accordingly, the top side of the transport container faces away from the ground surface in operative use.

In further embodiments, the support structure is configured so as to be retractable between the transport container and the rolling body, so that the rolling body can be retracted in the direction of the transport container. In this way, the extent of the transport container can be reduced with retracted rolling body.

In some embodiments, the support structure is configured so as to be foldable and/or retractable between the transport container and the coupling element or handle. This allows the extent of the transport device to be reduced in folded and/or retracted state.

In some embodiments, the rolling body is arranged so as to be suspended relative to the transport container or the support structure portion receiving the rolling body, relative to the remainder of the support structure. Such a suspended connection increases the compatibility towards different ground surfaces and their composition. Furthermore, it increases comfort on moving the transport device over ground surfaces with rough unevenness, since impacts are damped.

In some embodiments, the coupling or handle is arranged suspended relative to the transport container. Such springing increases the comfort and usage range of the transport device.

In some embodiments, when plastic elements are used, tension springs, leaf springs, gas dampers and springs are conceivable in order to provide a suspended connection between the transport container and the rolling body, or between the support structure portion receiving the rolling body and the rest of the support structure, and/or between the coupling or handle and the transport container.

In some embodiments, the support structure between the transport container and the rolling body is configured such that the rolling body can swivel about a longitudinal axis relative to the transport container. This gives the advantage that the torque, which may potentially be exerted on the rolling body by obstacles or unevenness on the ground surface, is not transmitted to the entire transport device. In such an embodiment, the support structure allows rotation of the rolling body about the longitudinal axis relative to the transport container.

In some embodiments, the coupling element, e.g., a handle, is configured so as to be rotatable or rotatable with damping, so that it allows rolling and/or pitching and/or yawing movements about a longitudinal and/or transverse and/or vertical axis. For example, ball swivel bearings etc. may be used here. The coupling element or handle may be connected to the support structure via a bearing, and thus allow a twist of the coupling element or handle relative to the transport device in up to three degrees of freedom.

In some embodiments, the coupling element is configured so as to be rigid or non-rotatable.

Some embodiments of the transport device are configured such that rolling movements about the longitudinal axis of the transport device are not possible or only possible with restrictions, in order to fully or partly compensate or damp the torque which is potentially exerted on the rolling body by obstacles or unevenness on the ground surface.

In some embodiments, the coupling element is configured so as to be laterally displaceable relative to the support structure, so that by its displacement, the center of gravity of the transport device may be oriented such that the transport device does not have a sideways or oblique position in the longitudinal direction, even if the center of gravity does not lie precisely in the middle of the transport device, for example because of its uneven loading In some embodiments, the transport container is formed by at least one case and/or rucksack or bag and/or net and/or suitcase etc. The transport container may here be open on one side and/or closable, i.e., closed, so that the objects to be transported, in particular luggage, cannot fall out. The transport container may be formed by connected material strips or by hard shell elements or similar.

In further embodiments, the transport device comprises at least one carrying strap, in particular two shoulder straps. The at least one carrying strap is fixedly or releasably connected to the transport device at least at one point, in particular at two points, and is designed as a material strip. The carrying strap allows carrying or lifting of the transport device.

In some embodiments, the transport device may comprise at least two wheels which are arranged on the transport device so as to be rotatable about a rotational axis.

In some embodiments, on the side facing the rolling body, at least two, in particular also four additional wheels and/or rollers may be rotatably arranged on the transport container, and allow the pulling of the transport device, in particular in a position in which the rolling body is folded up into the transport container. In the embodiment with two additional wheels and/or rollers, in corresponding operative use, more than half the volume of the transport container is arranged above the side of a plane facing away from the ground, wherein said plane is defined by two points on the axis of symmetry of the rolling body, in the unfolded position, and the center point of the coupling element or handle, also in the unfolded position. The wheels and/or rollers allow pulling of the transport device on a flat or smooth ground surface, in a position in which the center of gravity of the transport container is arranged in a region above the wheels. This reduces the torque acting on the coupling element or handle and increases the comfort of pulling of the transport device. In this method of use, the rolling body is not used.

In some embodiments, the transport device has a pull strap comprising a connection device, via which the transport device may be releasably connected to the pull strap, wherein the connection device is fixedly connected to the pull strap so as to be rotatable or rotatable with damping, or rigid or non-rotatable. The pull strap may be configured as a material loop for wrapping around the body of the user, and allows the transport device to be pulled along in an back-friendly, energy-saving manner.

In some embodiments, the transport device may comprise a pull strap which may be releasably connected to the coupling so as to be rotatable or rotatable with damping or rigid.

In some embodiments, the transport device may be equipped with a (manual) pump, a pump bag or pressure capsule for inflating the rolling body.

In some embodiments, the transport device may be equipped with an electric drive of the rolling body.

In some embodiments, the transport device may comprise at least one carrying strap, in particular two shoulder straps.

According to a further aspect, a transport device according to the disclosure may comprise a support structure, a coupling element, and a rolling body which may have a rotational symmetry. The diameter of the rolling body perpendicular to its axis of symmetry may be less than or equal to the length or width the rolling body. The support structure interconnects the coupling element and rolling body, and the support structure between the coupling element and the rolling body is configured such that a load can be arranged thereon. In operative use, the load here is located on a first side of a plane which faces the ground surface in operative use. The plane is defined by two points on the axis of symmetry of the rolling body and the center point of the coupling element.

In some embodiments, the load may in particular be configured as a transport container. The above-mentioned embodiments are however also applicable to a transport device which comprises a differently configured load.

A further aspect concerns a method for use of a transport device for transporting a load, in particular luggage, which may comprise the following steps:

a) provision of a transport device comprising:
  I. a support structure;
  II. a coupling element;
  III. a rolling body with an axis of symmetry, wherein the rolling body has a rotational symmetry, and a diameter of the rolling body is less than or equal to its extent along the axis of symmetry;
  IV. wherein the support structure interconnects the coupling element and the rolling body,
b) loading the transport device by placing the load on the support structure, wherein in the applied state, the load is arranged on a first side of a plane, in particular a side facing a ground surface in an operative state, wherein the plane is defined by two points on the axis of symmetry and a center point of the coupling element, and wherein the load is arranged between the coupling element and the rolling body, and
c) moving the transport device forward, wherein the rolling body rolls over the ground surface and the load is arranged on the first side of the plane.

In some embodiments, the provided transport device comprises a transport container for receiving objects, wherein the transport container is releasably or fixedly connected to the support structure between the coupling element and the rolling body, for example by a connecting mechanism, straps, a net, a tarpaulin, a bag or similar.

BRIEF DESCRIPTION OF SEVERAL VIEWS OF THE DRAWINGS

Aspects of the disclosure are now explained in more detail with reference to the exemplary embodiments shown in the appended figures, and the associated description. The drawings show.

DETAILED DESCRIPTION OF THE INVENTION

FIGS. 1, 2, 4a, 4b, 7a, 8, 9, 10a, 11, 12a-e and 13 show in a side view the transport device 1 which is pulled by a user over a ground surface U. The transport device here comprises a support structure 2 which interconnects the rolling body 4 to the coupling element, which is here configured for example as a handle 3. The transport container 5 is arranged on the support structure 2 between the rolling body 4 and the handle 3. The rolling body 4 is in direct contact with the ground surface. The handle 3 couples the transport device 1 to the user. The length of the support structure 2 is typically between 50 cm and 250 cm, in particular between 80 cm and 140 cm. The width of the support structure 2 is usually between 10 cm and 120 cm, in particular between 40 cm and 80 cm.

The volume of the transport container 5 is typically between 10 liters and 200 liters, in particular between 35 litres and 90 liters.

Figure 1:
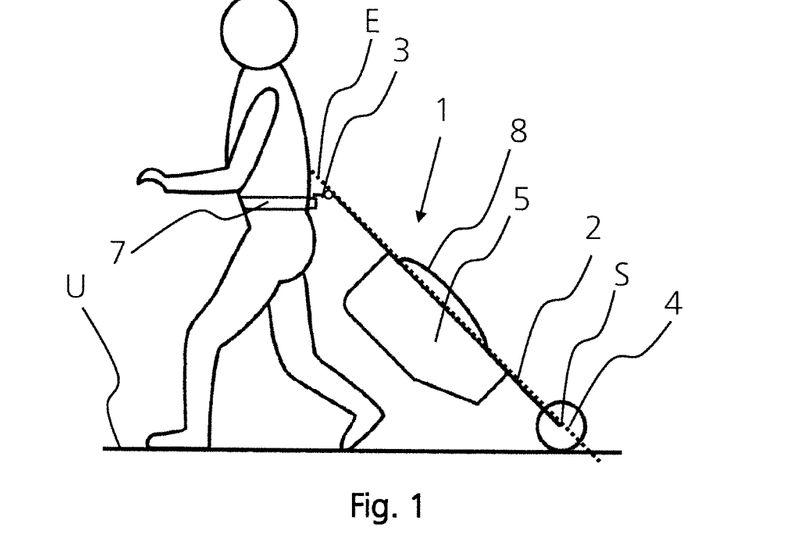
FIG. 1 is a schematic side view of a transport device according to the disclosure.

FIG. 1 shows an embodiment of the transport device with a support structure 2 which consists of an arrangement of rods. This gives the transport device 1 the necessary bending strength to minimize bending of the transport device 1 between the coupling element or the handle 3 and the rolling body 4 in the direction of the ground surface U. It is furthermore evident that the user carries at hip height a pull strap 7 which is configured as a belt looped around his body. The coupling element 3 is coupled to this pull strap 7 and thus interconnects the transport device 1 to the pull strap 7. A carrying strap can furthermore be seen on the transport device 1 and is here formed for example as two shoulder straps 8. The shoulder straps 8 each have two contact points at which they are fixedly or releasably connected to the transport device 1. Advantageously, these contact points lie respectively on the side of the transport container 5 facing the handle 3, and on the side of the transport container 5 facing the rolling body 4, i.e., the opposite side. The transport container 5 is arranged with more than half its volume (and hence, with typical or even loading, also the center of gravity of the transport device) on the side of the plane E facing the ground surface U. The plane E is defined by two points on an axis of symmetry S of the rolling body 4 and the center point of the coupling element or handle 3.

Figure 2:
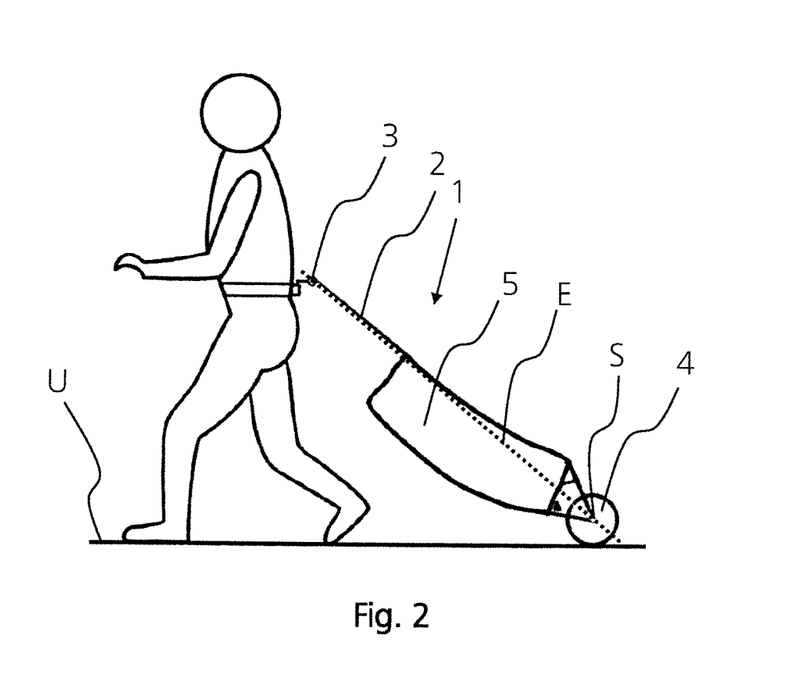
FIG. 2 is a schematic side view of a further transport device according to the disclosure.

FIG. 2 furthermore shows a further embodiment of the support structure 2 which comprises an arrangement of rods and is formed integrally with intrinsically flexible portions. The transport container 5 is arranged with more than half its volume (and hence, with typical or even loading, also the center of gravity of the transport device) on the side of the plane E facing the ground surface U. The plane E is defined by two points on an axis of symmetry S of the rolling body 4 and the center point of the coupling element or handle 3. The rolling body 4 is fixedly or releasably connected to the support structure 2 so as to be rotatable about the axis of symmetry S.

Figure 3A:
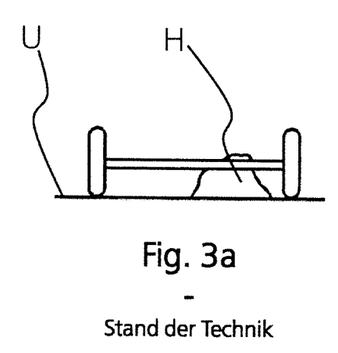
FIG. 3a is a transport means arrangement known from the prior art, with axle and wheels for a transport device for transporting luggage on a ground surface with obstacle.

To clarify the disclosure, FIG. 3a shows a transport means arrangement from the prior art in which two wheels are arranged at the ends of an axle. In side view, the arrangement is shown rolling over a ground surface U with an obstacle H. It illustrates the limitation of this arrangement for overcoming obstacles H, since the axle is blocked by an obstacle H if the ground clearance is not sufficient to pass over the obstacle H without contact.

Figure 3B:
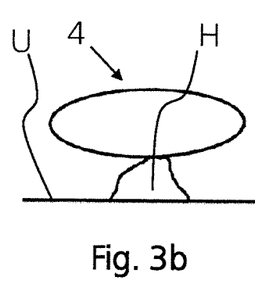
FIG. 3b is a schematic side view of the rolling body of a transport device according to the disclosure on a ground surface with obstacle.
Figure 3C:
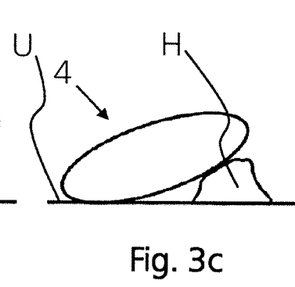
FIG. 3c is a schematic side view of the rolling body of a transport device according to the disclosure on a ground surface with obstacle.

FIGS. 3b, 3c show in comparison a rolling body 4 of a transport device 1 according to the disclosure when overcoming an obstacle H on the ground surface U. FIG. 3c in particular shows the advantageous design of the rolling body 4 as a rotational ellipsoid. In this form, the rolling body 4 can be tilted by rotation about an axis running through its volume center point and perpendicularly to its axis of symmetry S, such that it can pass or roll over the obstacles H.

Because of the design of the rolling body 4 tapering towards the ends, only a slight additional torque is exerted on the center of gravity of the transport container 5, i.e., a slight additional torque compared with the rolling body 4 configured as a cylinder.

Figure 4A:
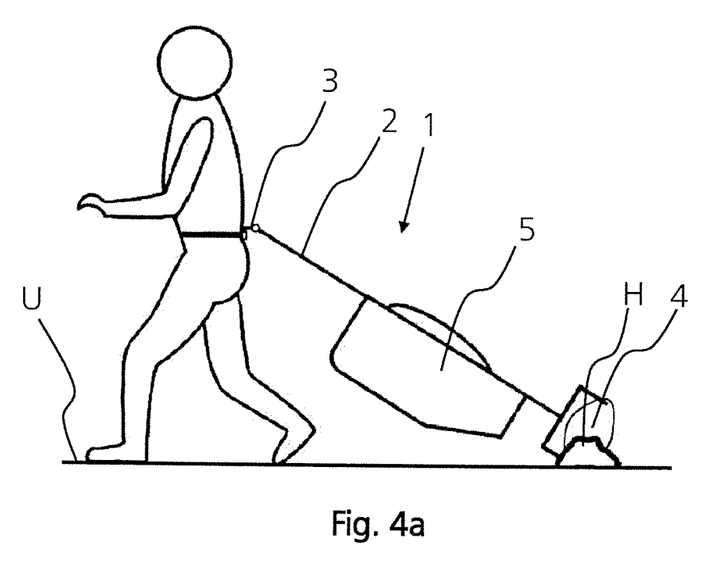
FIG. 4a is a schematic side view of a transport device according to the disclosure on a ground surface with obstacle.

FIG. 4a shows the tilted passing of obstacles H by the rolling body 4 as illustrated in FIG. 3c, here in a side view of the transport device 1. It also shows an embodiment of the support structure 2 which allows separation of the tilt movement of the rolling body 4 from the movement of the transport container 5 for overcoming the obstacle H. On a rotation of the rolling body 4 about the axis running through its volume center point and perpendicularly to its axis of symmetry S, this rotation of the support structure 2 is not transmitted to the transport container 5.

Figure 4B:
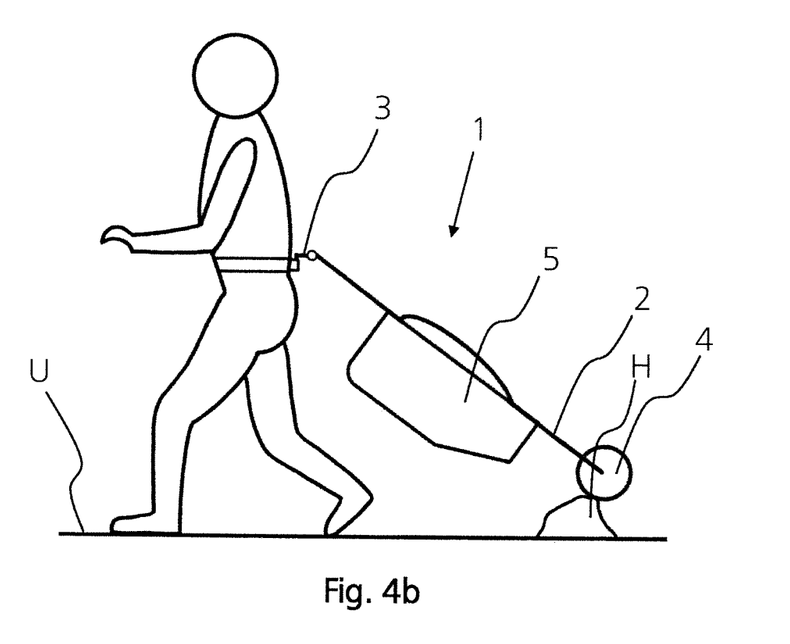
FIG. 4b is a further schematic side view of a transport device according to the disclosure on a ground surface with obstacle.

FIG. 4b shows the passing of obstacles H by the rolling body 4 in an embodiment of the support structure 2 which does not allow separation of the tilt movement of the rolling body 4 from the movement of the transport container 5 for overcoming the obstacle H.

Figure 5:
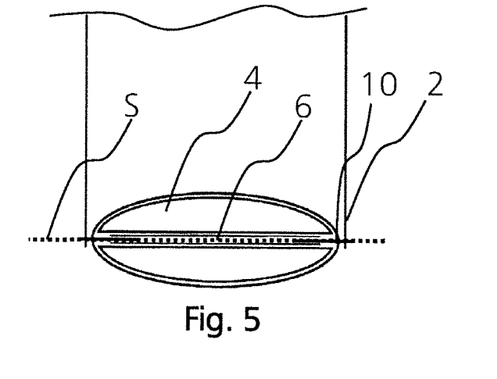
FIG. 5 is a schematic top view of a cross-section of a rolling body connected to the support structure.
Figure 6:
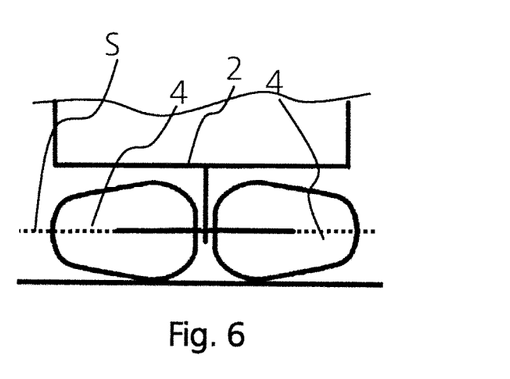
FIG. 6 is a schematic top view of a cross-section of a two-piece rolling body connected to the support structure.

FIGS. 5 and 6 show an extract of the support structure 2 in which the rolling body 4 is arranged. The axis of symmetry S runs through the center point of the rolling body 4. The diameter of the rolling body 4 is here less than or equal to the length or width of the rolling body 4. The rolling body 4 furthermore has a rotational symmetry and is configured such that it tapers in diameter towards the ends along the axis of symmetry S. The length of the rolling body 4 may for example lie between 5 cm and 90 cm, in particular between 20 cm and 50 cm. The maximum diameter of the rolling body 4 is for example between 3 cm and 40 cm, in particular between 5 cm and 20 cm.

FIG. 5 shows an embodiment of the rolling body 4 in the form of a rotational ellipsoid, comprising an axle 6 for laterally receiving the support structure end pieces 10, and for mounting the rolling body 4 so as to be rotatable about the axis of symmetry S. FIG. 6 shows an alternative embodiment of the rolling body 4 as a double cone. Here, the rolling body 4 is divided into two conical symmetrical halves. In this embodiment of the rolling body 4, the two halves of the rolling body are connected on the inside of the respective half to the support structure end pieces 10 and are rotatable about the axis of symmetry.

Figures 7A, 7B:
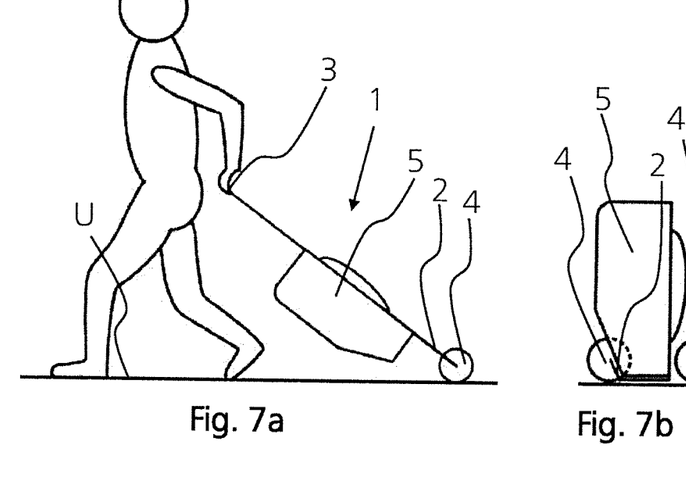
FIG. 7a is a schematic side view of a transport device according to the disclosure with foldable support structure.
FIG. 7b is a schematic side view of a transport device according to the disclosure with folded support structure portion.
Figure 7C:
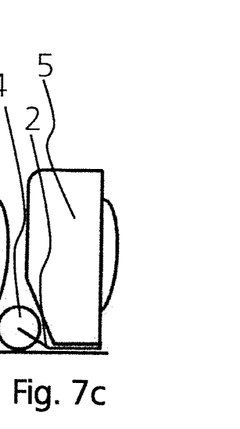
FIG. 7c is a schematic side view of a transport device according to the disclosure with folded support structure portion.
Figure 11:
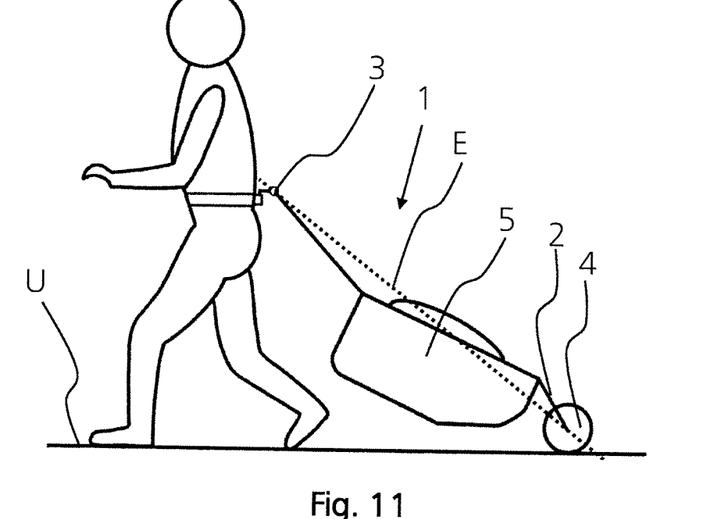
FIG. 11 is a schematic side view of a transport device according to the disclosure with pull strap.

FIG. 7a-c show various states of the transport device 1 in an embodiment in which the support structure 2 is configured so as to be foldable between the transport container 5 and the rolling body 4 in a direction towards the transport container 5. In FIG. 7a, the support structure 2 is shown in an unfolded or extended state. The possible positions of the rolling body 4 lie between the illustrated extended position and the folded position shown in FIGS. 7b-c, i.e., the transport device 1 may also be used or maneuvered in a slightly angled position (in particular between the coupling element and transport container, and/or between the rolling body and transport container, as shown in FIG. 11). FIG. 7b shows the rolling body 4 in folded state, at least partially embedded in a recess provided for this in the transport container 5. In FIG. 7c, the rolling body 4 is arranged on the transport container 5 in the folded state of the support structure 2.

Figure 8:
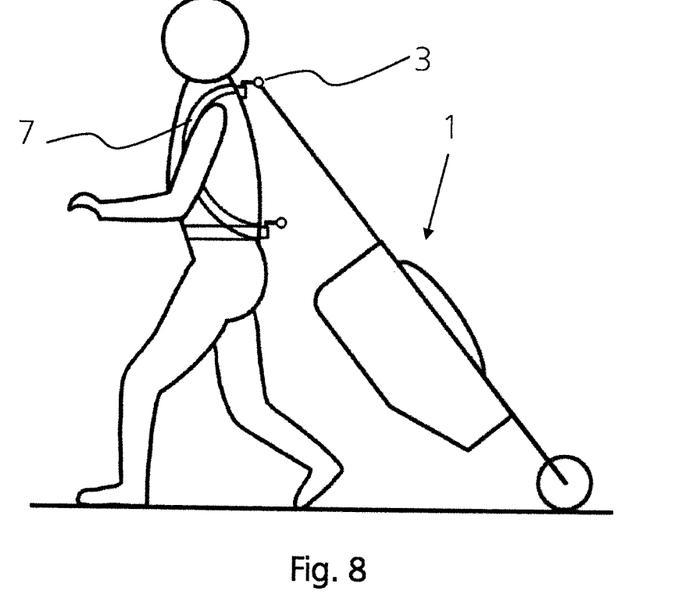
FIG. 8 is a schematic side view of a transport device according to the disclosure with pull strap.

FIG. 8 shows an embodiment of the transport device 1 with a pull strap 7, in which the transport device 1 is releasably or fixedly connected to the pull strap 7 via the coupling element 3 at shoulder height of the user.

Figure 9:
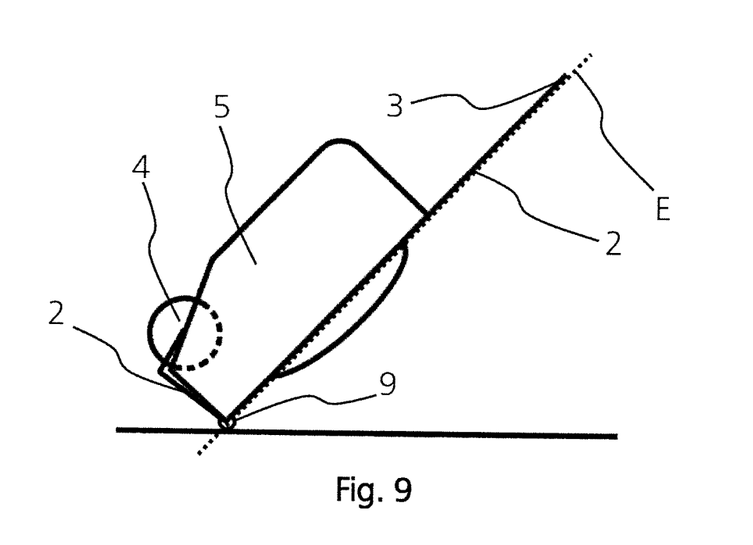
FIG. 9 is a schematic side view of a transport device according to the disclosure with wheels or rollers.

FIG. 9 shows a further embodiment of the foldable support structure 2. Here, at least two additional wheels or rollers 9 are arranged at the lower end of the transport container 5 in the plane E, which is defined by two points on the axis of symmetry S of the rolling body 4, in unfolded position, and the center point of the coupling element 3. These wheels or rollers 9 allow an alternative rolling-pulling or sliding of the transport device at the coupling element or handle 3, in a similar fashion to a conventional roller suitcase. The center of gravity of the transport device is here located as centered as possible above the rotational axis of the wheels or rollers 9.

Figure 10A:
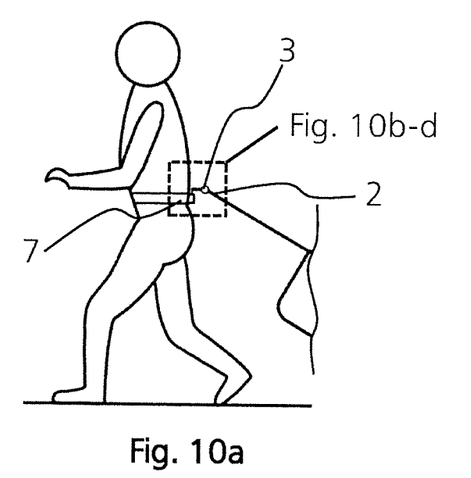
FIG. 10a is an extract from a schematic side view of a transport device according to the disclosure.

FIG. 10a shows a user pulling the transport device and wearing a belt-like pull strap 7. The coupling element 3 is coupled to the pull strap 7.

Figure 10B:
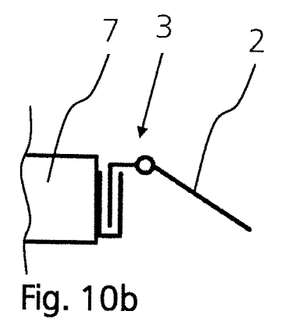
FIG. 10b is an enlarged extract from FIG. 10a showing the coupling element.
Figure 10C:
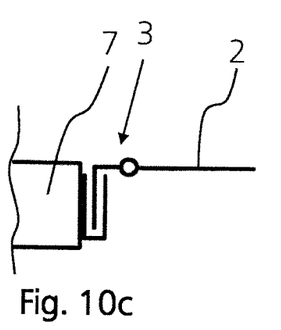
FIG. 10c is an enlarged extract from FIG. 10a showing the coupling element.
Figure 10D:
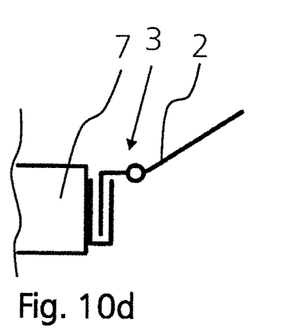
FIG. 10d is an enlarged extract from FIG. 10a showing the coupling element.

FIGS. 10b-d show an extract from FIG. 10a in various deflection states of the coupling element 3. The three degrees of freedom achieved by the coupling element, for example by a ball joint arranged in the coupling element, allow a flexible orientation of the transport device 1 relative to the pull strap 7 and hence to the user. This is advantageous since, for example, height differences in the ground surface between the position of the user and the position of the transport means 1 can be compensated. Furthermore, the user can bend relative to the transport device 1 since the coupling element 3 can ensure such kinking.

FIG. 11 furthermore shows a transport device 1 in an angled position (in particular between the coupling element 3 and the transport container 5, and between the rolling body 4 and the transport container 5).

Figure 12A:
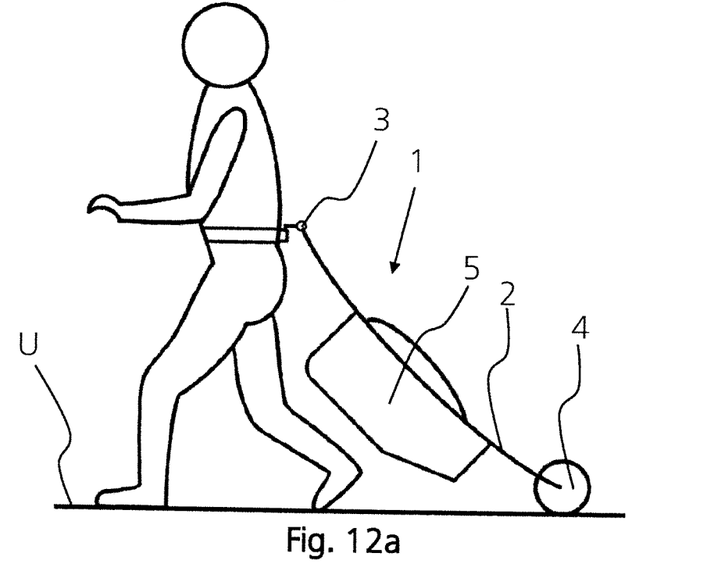
FIG. 12a is a schematic side view of a further transport device according to the disclosure with flexible support structure.
Figure 12B:
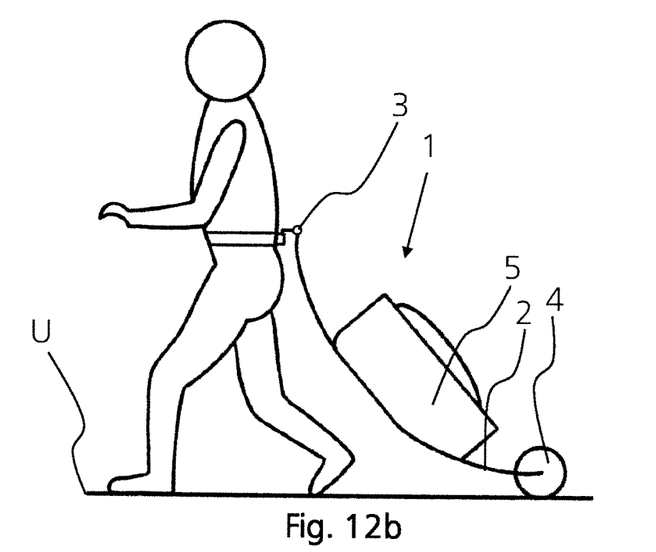
FIG. 12b is a schematic side view of a further transport device according to the disclosure with flexible support structure.

FIGS. 12a and 12b show further embodiments of the support structure 2 which is configured so as to be flexible throughout.

Figure 12C:
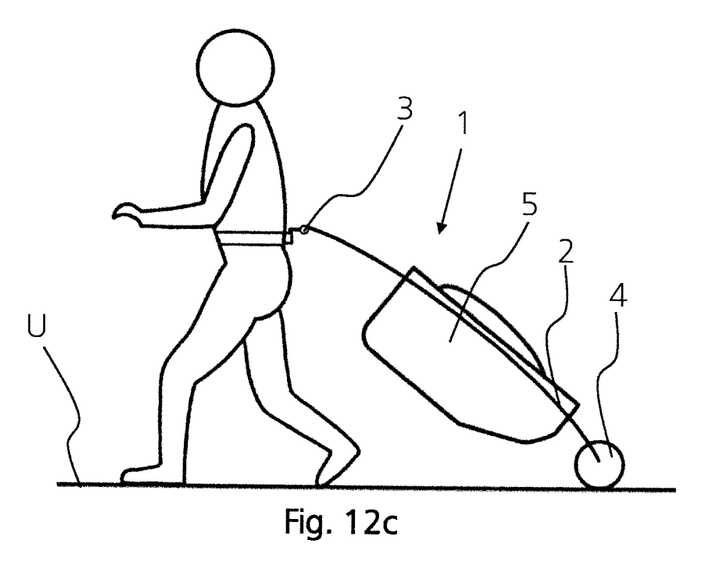
FIG. 12c is a schematic side view of a further transport device according to the disclosure with suspended support structure.
Figure 12D:
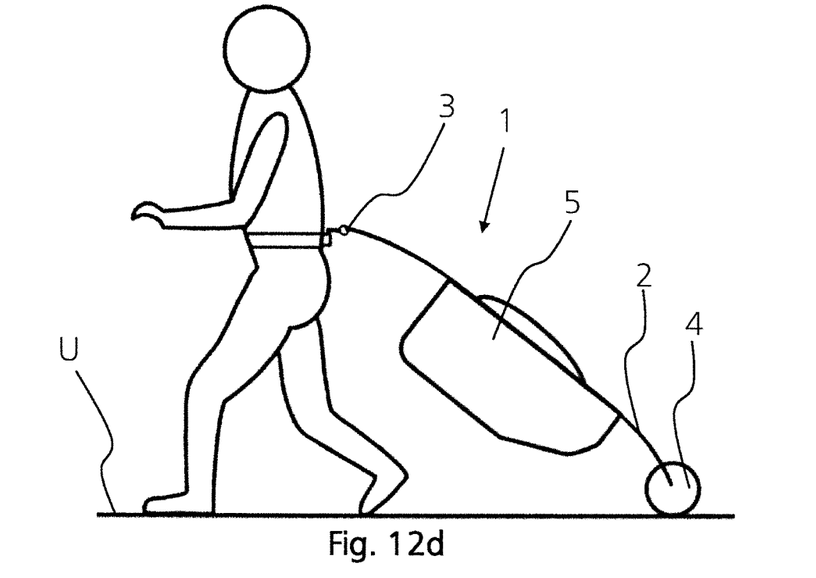
FIG. 12d is a schematic side view of a further transport device according to the disclosure with suspended support structure.
Figure 12E:
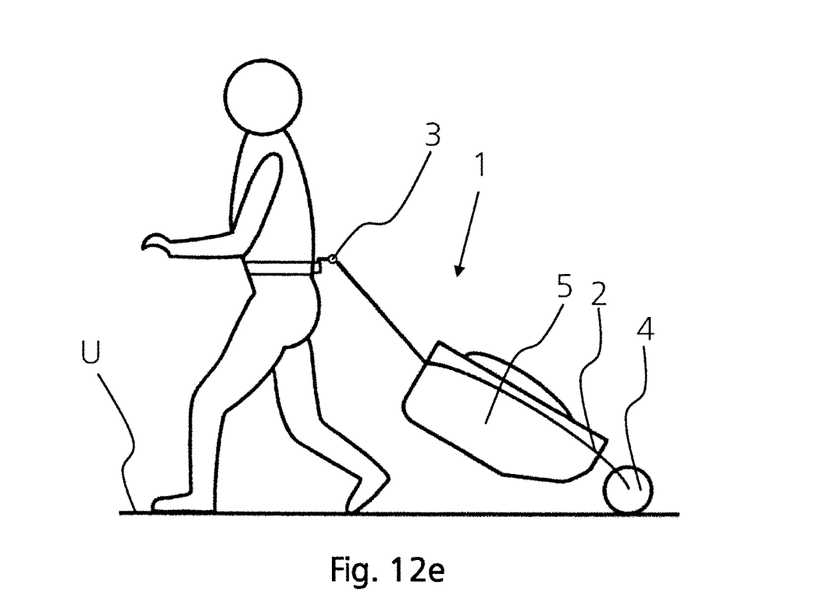
FIG. 12e is a schematic side view of a further transport device according to the disclosure with suspended support structure.

FIGS. 12c to 12e show further embodiments of the transport device 1 according to the disclosure, with a support structure 2 which is configured so as to be suspended and arch-shaped at least in regions. FIGS. 12a and 12b show an arch-shaped support structure 2 which is oriented in the direction of the ground surface U, while FIGS. 12c to 12e show an arch-shaped support structure 2 which is oriented against the direction of the ground surface U. The support structure 2 shown in FIG. 12e is configured so as to be arch-shaped only in the region between the rolling body 4 and the end of the transport container 5 on the coupling element side.

Figure 13:
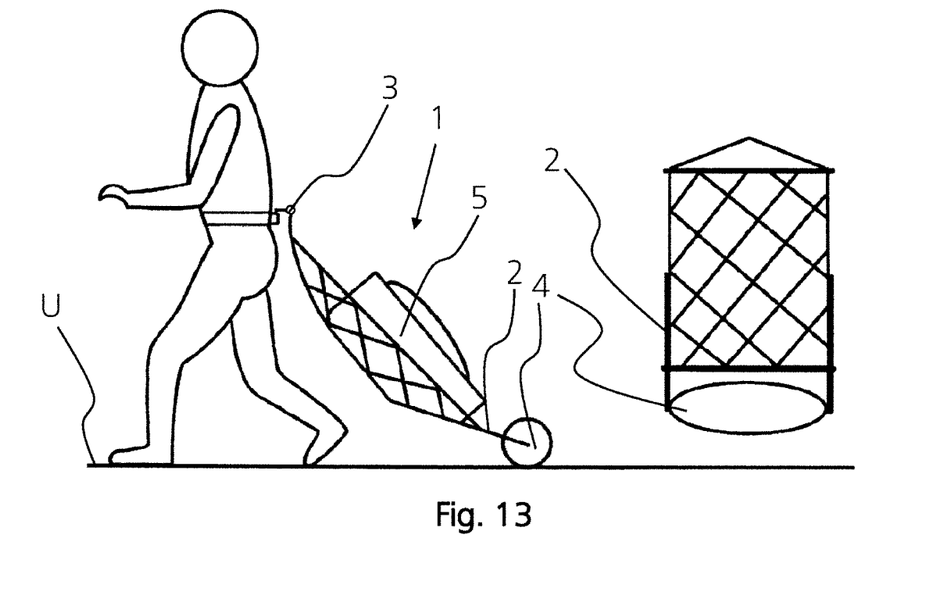
FIG. 13 is a schematic side view and top view of a further transport device according to the disclosure with a net as part of the support structure.

FIG. 13 shows a further embodiment of the support structure 2 which is configured so as to be flexible in at least one portion and integrally equipped with a net, wherein the portion of the support structure 5 between the rolling body 4 and transport container 5 or net has the necessary strength to prevent a sagging of the transport device 1 with direct contact of the transport container 5 on the ground surface U in operative use. The support structure 2 may here be configured so as to be foldable and/or collapsible.

The invention claimed is:

1. A transport device (1), in particular for transporting luggage, the transport device (1) comprising:
 a support structure (2);
 a coupling element (3);
 a rolling body (4) with an axis of symmetry(S), wherein the rolling body (4) has a rotational symmetry, and a diameter of the rolling body (4) is less than or equal to its extent along the axis of symmetry(S); and
 a transport container (5) for receiving objects, in particular luggage, wherein the transport container is releasably or fixedly connected to the support structure (2);
 wherein the support structure (2) interconnects the coupling element (3) and the rolling body (4), and more than half a volume of the transport container (5) is arranged on a first side of a plane (E) facing a ground surface (U) in operative use, wherein the plane (E) is defined by two points on the axis of symmetry(S) and a center point of the coupling element (3), and wherein the transport container (5) is arranged between the coupling element (3) and the rolling body (4); and
 wherein the coupling (3) element is configured to be laterally displaceable relative to the support structure (2).

2. The transport device (1) as claimed in claim 1, wherein the support structure (2) comprises an arrangement of rods and/or adjoins the transport container (5).

3. The transport device (1) as claimed in claim 1, wherein the support structure (1) is configured so as to be flexible in at least a part region.

4. The transport device (1) as claimed in claim 1, wherein the support structure (2) is configured so as to be angled between the coupling element (3) and the transport container (5) and/or between the rolling body (4) and the transport container (5).

5. The transport device (1) as claimed in claim 1, wherein the rolling body (4) is configured such that it tapers in diameter towards its ends along the axis of symmetry, in particular in the form of a rotational ellipsoid or a double cone.

6. The transport device (1) as claimed in claim 1, wherein the rolling body (4) is divided into two symmetrical halves.

7. The transport device (1) as claimed in claim 1, wherein the support structure (2), on a side opposite the coupling element (3), is configured for receiving the rolling body (4) such that the rolling body (4) is connected to the support structure (2) so as to be rotatable about its rotational axis.

8. The transport device (1) as claimed in claim 1, wherein the rolling body (4) is releasably connected to the support structure (2).

9. The transport device (1) as claimed in claim 1, wherein the rolling body (4) comprises at least one inflatable segment and at least one valve.

10. The transport device (1) as claimed in claim 1, wherein the rolling body (4) comprises at least one flexible and tear-resistant material, in particular plastic.

11. The transport device (1) as claimed in claim 1, wherein the coupling element (3) is foldable and/or retractable in a direction towards the underside or top side of the transport container (5).

12. The transport device (1) as claimed in claim 1, wherein the rolling body (4) and/or the coupling element (3) are each arranged suspended in relation to the transport container (5).

13. The transport device (1) as claimed in claim 1, wherein the rolling body (4) is movable in relation to the transport container (5) about an axis transversely to the axis of symmetry(S).

14. The transport device (1) as claimed in claim 1, wherein the coupling element (3) allows rolling and/or pitching and/or yawing movements about a longitudinal and/or transverse and/or vertical axis.

15. The transport device (1) as claimed in claim 1, wherein the rolling body (4) is foldable and/or retractable in a direction towards the underside or top side of the transport container (5).

16. The transport device (1) as claimed in claim 15, wherein the transport device (1) comprises at least two wheels (9) which are arranged on the transport device (1) so as to be rotatable about a rotational axis.

17. The transport device (1) as claimed in claim 1, wherein the transport device (1) comprises a pull strap (7) which is releasably connected to the coupling element (3), wherein the releasable connection is rotatable, rotatable with damping or rigid.

18. A method for use of a transport device (1) for transporting a load (5), in particular luggage, comprising the following steps:
- providing a transport device (1) comprising:
- a support structure (2);
- a coupling element (3);
- a rolling body (4) with an axis of symmetry(S), wherein the rolling body (4) has a rotational symmetry and a diameter of the rolling body (4) is less than or equal to its extent along the axis of symmetry(S);
- wherein the support structure (2) interconnects the coupling element (3) and the rolling body (4);
- wherein the coupling (3) is configured to be laterally displaceable relative to the support structure (2);
- loading the transport device (1) by placing the load (5) on the support structure (2), wherein in the applied state, the load (5) is arranged on a first side of a plane (E) facing a ground surface (U) in an operative state, wherein the plane (E) is defined by two points on the axis of symmetry(S) and a center point of the coupling element (3), and wherein the load (5) is arranged between the coupling element (3) and the rolling body (4), and
- moving the transport device (1) forward, wherein the rolling body (4) rolls over the ground surface (U) and the load (5) is arranged on the first side of the plane (E).

19. The method for use of a transport device (1) as claimed in claim 18, wherein the transport device (1) comprises a transport container (5) for receiving objects, wherein the transport container is releasably or fixedly connected to the support structure (2) between the coupling element (3) and the rolling body (4), by at least one of a connecting mechanism, straps, a net, a tarpaulin, and a bag.

* * * * *